W. NASH.
TRACTOR.
APPLICATION FILED JUNE 13, 1919.

1,391,689.

Patented Sept. 27, 1921.
4 SHEETS—SHEET 4.

Inventor
William Nash.
By [signature]
Attorney

UNITED STATES PATENT OFFICE.

WILLIAM NASH, OF DENVER, COLORADO.

TRACTOR.

1,391,689. Specification of Letters Patent. Patented Sept. 27, 1921.

Application filed June 13, 1919. Serial No. 303,873.

*To all whom it may concern:*

Be it known that I, WILLIAM NASH, a citizen of the United States, residing at the city and county of Denver and State of Colorado, have invented certain new and useful Improvements in Tractors; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in tractors of the class in which farming implements, as plows, may be mounted directly thereon, as distinguished from being trailed in the rear. Furthermore, my improved machine is operated by a motor, as an internal combustion engine, from which the power is delivered through a suitable shaft to friction wheels, which are arranged in suitable proximity to relatively large coöperating disks, which the two friction wheels respectively engage, and whereby power is transmitted through the medium of shafts and sprocket gearing to forwardly located traction wheels. The said friction wheels are suitably mounted on a shaft member, whereby they are made to engage the relatively large coöperating friction disks at varying distances from the axes of the disks, whereby the driving speed is regulated and controlled. The friction wheels are adjustable longitudinally of their shaft by means of a screw having right and left threads, whereby the two wheels are made to approach or recede from each other, as may be required. The shaft of the friction wheels is shiftable from the straight-line or neutral position into a position slightly diagonal to the direction of travel for the purpose of bringing the friction wheels or pinions into coöperative contact with the adjacent disks. When the friction pinions are moved to cause them to engage the coöperating friction disks in one relation, the motor is driven forwardly; while when the friction pinions are caused to engage the disks in the reverse position, the travel of the machine will be rearwardly.

The friction disks are mounted on two distinct shafts, each of which is provided at its outer extremity with a clutch member, which coöperates with a clutch member which is slidable on an extension of the shaft and carries a sprocket wheel through the medium of which and a suitable chain, power is transmitted to a sprocket wheel mounted on the hub of the forwardly located traction wheel on the same side of the machine. By disengaging the clutch member carrying the sprocket wheel on one side of the machine from the clutch member on the shaft of the corresponding disk, while the sprocket wheel clutch member on the opposite side is interlocked with the shaft of the friction disk, a very short turn may be made when power is applied to the machine, since the traction wheel on the side where the power is disconnected will serve as a sort of pivot around which the other wheel will travel, thus making an exceedingly short turn. This may be done either by moving the power-connected traction wheel forwardly or rearwardly, as will be hereinafter more fully explained.

Having briefly outlined my improvement, I will proceed to describe the same in detail, reference being made to the accompanying drawing, in which is illustrated an embodiment thereof. In this drawing.

The same reference characters indicate the same parts in all the views.

Figure 2:
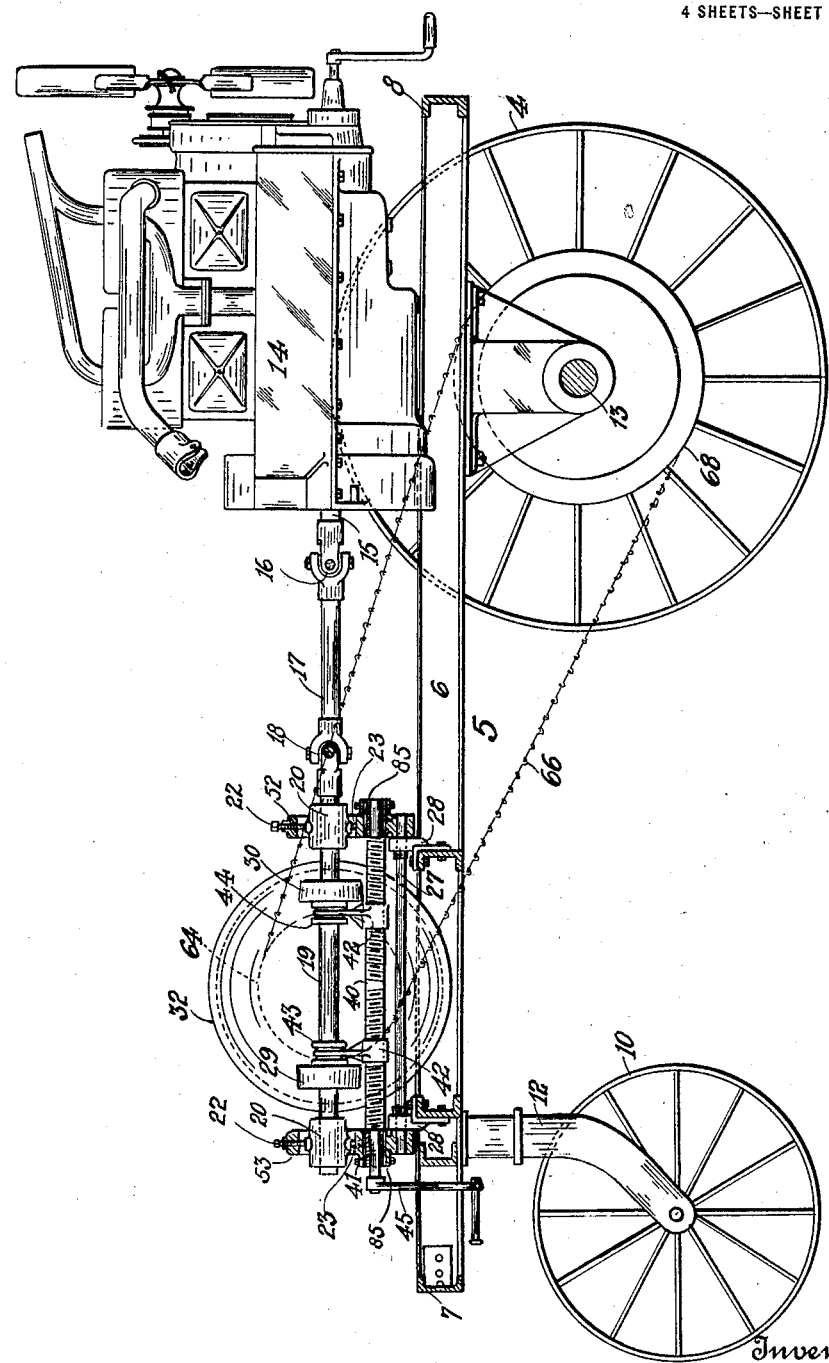
Fig. 2 is a sectional side elevation, the section being taken approximately on the line 2—2, Fig. 1, viewed in the direction of the arrows.

Let the numeral 5 designate a suitable, relatively stationary, frame, composed of parallel side bars 6, and front and rear cross bars, 7 and 8. This frame is supported by forwardly located traction wheels, 3 and 4, and a rearwardly located caster wheel 10, the latter being connected with the frame by a fork, 12, and adapted to swing or rotate on a vertical axis, as is usual with structures of this character. The traction wheels are journaled on a stationary axle 13, which is connected with the main framework in any suitable manner. Upon the forward portion of the framework is mounted a motor 14, preferably, and as illustrated in the drawing, of the internal combustion engine type, the motor shaft 15 having a universal joint connection 16 with a shaft member 17 which in turn is connected by a universal joint 18, with a shaft 19, journaled in bearings 20, the latter being pivotally mounted through the medium of yokes, 52 and 53, on vertical axes, the upper part of each bearing being engaged by a pivot bolt 22, threaded in the yoke, while the lower part of the bearing is provided with a pivot 23, which engages a shallow socket 24, in the lower part of the yoke. The two yokes are open, as shown at 25, to receive the bearings 20 for the shaft 19. Furthermore, each yoke extends downwardly below the openings 25 and is journaled, as shown at 26, on a shaft 27, which is mounted in the stationary framework of the machine as shown at 28. (See Fig. 2). The yokes 52 and 53 are shifted laterally in opposite directions for the purpose of moving the shaft 19 to occupy a slightly diagonal position with the direction of travel, as illustrated in Fig. 4, whereby friction pinions 29 and 30 are brought into coöperative engagement with relatively large friction disks, 31 and 32, which are respectively secured to shafts 33 and 34, which are respectively journaled in bearings 35 and 36, mounted on the framework of the machine and directly supported by frame members 37 and 38, which in turn are mounted on spaced transverse bars, 39, whose opposite extremities are supported by the parallel main frame bars, 6.

Between the shaft 19 and the pivot shaft 27, a screw shaft 40 is journaled in the yokes 52 and 53. This screw shaft has right and left threads, which respectively engage nuts, 41 and 42, which are connected with grooved collars, 43 and 44, with which the friction pinions 29 and 30 are respectively provided, the said pinions being splined on the shaft 19, and lengthwise adjustable thereon through the medium of the screw shaft, whereby they are caused to engage the friction disks 31 and 32, at varying distances from the axes of the disks, according as it is necessary to increase or diminish the speed of the disks through the medium of which power is transmitted to the traction wheels, 3 and 4, as hereinafter more fully explained. It will be readily understood that as the screw shaft 40 is rotated in one direction, the nuts 41 and 42 will be moved toward each other, and a corresponding movement imparted to the friction pinions 29 and 30; while as the screw shaft is rotated in the opposite direction, the friction pinions would be caused to move away from each other on the shaft 19. It will also be understood that the speed of the friction disks for a given rotation of the shaft 19 will be increased as the pinions approach the centers of the disks, while the speed of the disks will be diminished as the pinions engage them farther from their centers, or nearer their peripheries. By virtue of this construction and arrangement, the speed or travel of the disks may be accurately controlled, and through them the travel of the traction wheels. For convenience of manipulation, the screw shaft 40 is provided with a hand crank 45.

Figure 3:
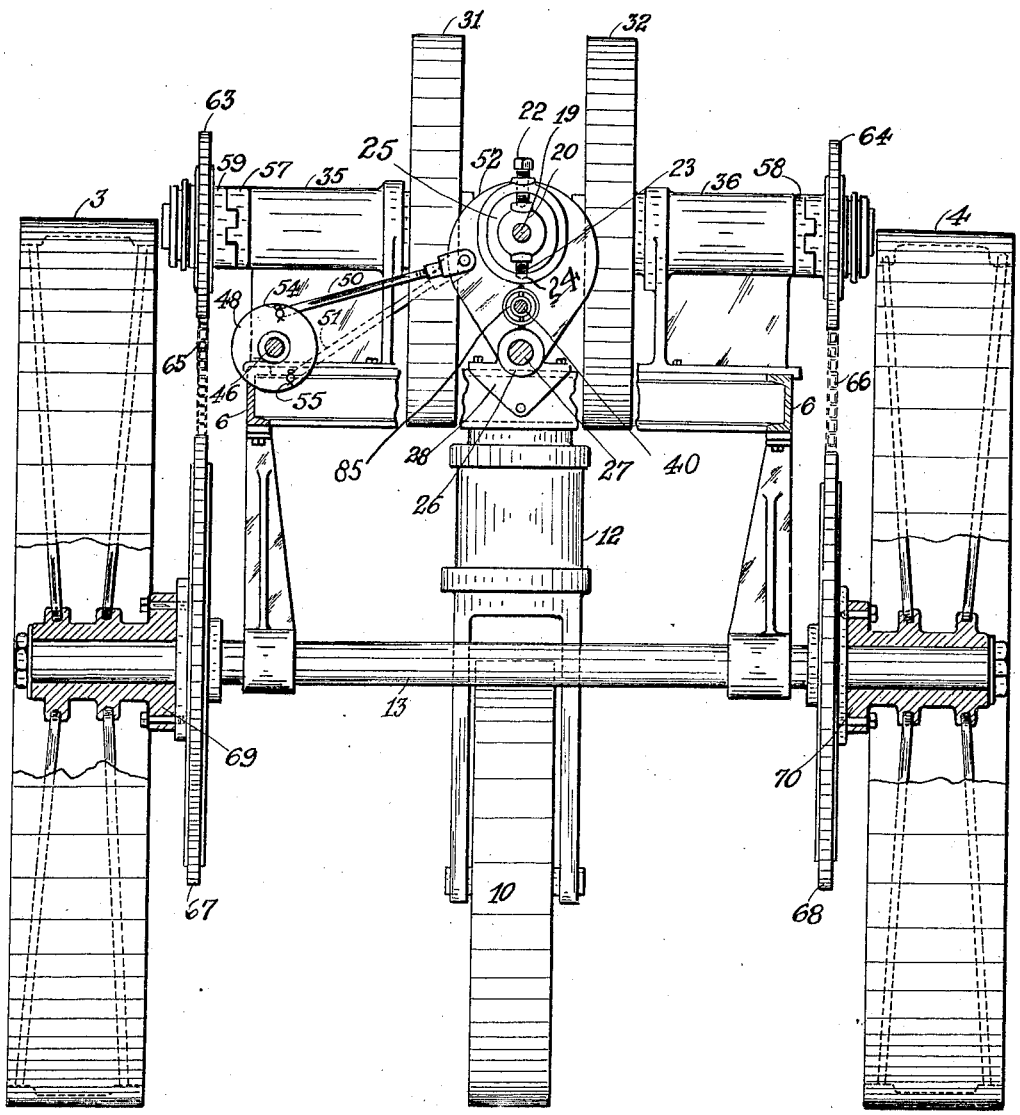
Fig. 3 is a front end elevation partly in section, viewed in the direction of arrows 3 Fig. 1.
Figure 4:
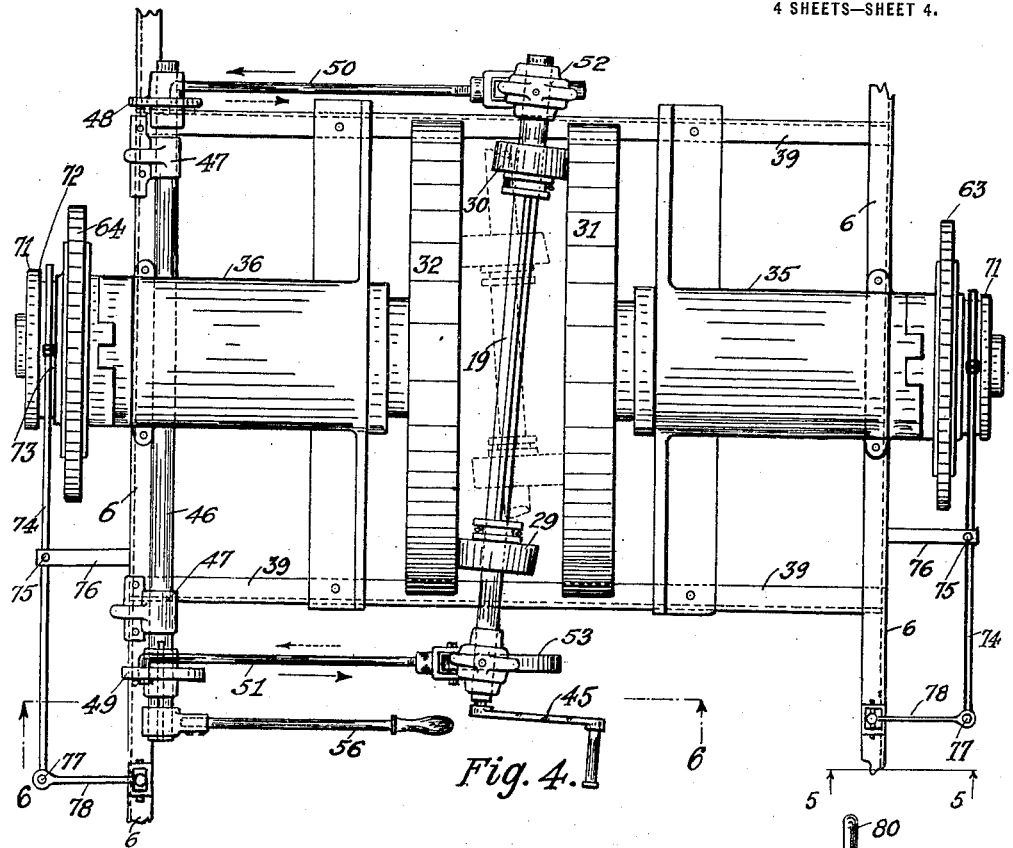
Fig. 4 is a fragmentary top plan view of the rear portion of the machine shown on a somewhat larger scale than in the other views.

The mechanism for shifting the yokes 52 and 53 laterally and in opposite directions on the pivot shaft 27 for the purpose of slightly diagonally positioning the shaft 19 in order to bring the friction pinions 29 and 30 simultaneously into coöperative engagement with the respective friction disks, as illustrated in Fig. 4, will now be described. A shaft 46 is journaled on the frame work of the machine near one of the side frame bars 6, as shown at 47. Near the opposite extremities of this shaft are respectively keyed crank disks 48 and 49, which are connected by means of pitmen, 50 and 51, with the yokes 52 and 53, the opposite extremities of the pitmen being connected with the crank wheels and yokes in such a manner that as a partial rotary movement is imparted to the shaft 46, the yokes will be moved on their pivot shaft in opposite directions sufficiently to produce the diagonal position of the shaft 19, indicated in Fig. 4, whereby the friction pinions are brought into coöperative frictional engagement with the disks 31 and 32. In order to produce this result, the pitmen 50 and 51 are connected with their respective crank wheels 48 and 49, at relatively different points, as shown at 54 and 55, the pitmen being connected with the two yokes at corresponding points, as best illustrated in Fig. 3. For convenience of manipulation, the shaft 46 is provided with a lever arm 56. The friction disks 31 and 32 are secured to their respective shafts 33 and 34, as heretofore explained, these shafts being journaled in bearings 35 and 36 mounted on the framework. The outer extremities of these shafts are respectively provided with enlarged members 57 and 58, having clutch faces 59 and 60, which are adapted to coöperate with clutch members 61 and 62, with which sprocket wheels 63 and 64 are provided, these sprocket wheels being normally loose on the outer portions or extensions of the two shafts 33 and 34. These sprocket wheels are respectively connected by means of chains 65 and 66 with larger sprocket wheels, 67 and 68, which are fast on the hubs 69 and 70 of the traction wheels 3 and 4.

Provision is made for disconnecting either of the sprocket wheels 63 or 64 to prevent rotation with its corresponding shaft 33 or 34, and when this is done, the rotary movement of the corresponding traction wheel, 3 or 4, also ceases. This is accomplished through the medium of any suitable mechanism. In the drawing, each of the sprocket wheels 63 and 64 is provided on the outside or on the opposite side from the clutch face 59 or 60, with a part 71, provided with a circumferential groove 72, the latter being engaged by the bifurcated extremity 73 of a lever 74, fulcrumed as shown at 75 on a stationary bracket 76, extending outwardly and upwardly from the adjacent frame bar 6. One arm of this lever extends rearwardly beyond the fulcrum, its rear extremity being pivotally connected as shown at 77 with a rod 78, whose opposite extremity is pivotally connected as shown at 79 with a lever arm 80, pivotally connected as shown at 81 with the frame bar 6, and extending upwardly a suitable distance. When it is desired to disconnect either sprocket wheel 63 or 64 from the adjacent clutch face of the corresponding shaft, the lever arm 80 is moved in the proper direction to accomplish this purpose. As illustrated in the drawing (see Fig. 1), the sprocket wheel 64 is moved outwardly on the extension of the shaft 34, whereby the clutch face of the sprocket wheel is disconnected from the clutch face 58 of the shaft. In this event, when the engine is running and both friction disks are rotated by virtue of their engagement with the friction pinions, the sprocket wheels 64 will cease to rotate and the traction wheel 4 will also remain inactive rotatably. The object of this operation is to make it practicable to make short turns at the end of the field, or wherever such turns may be required.

Figure 1:
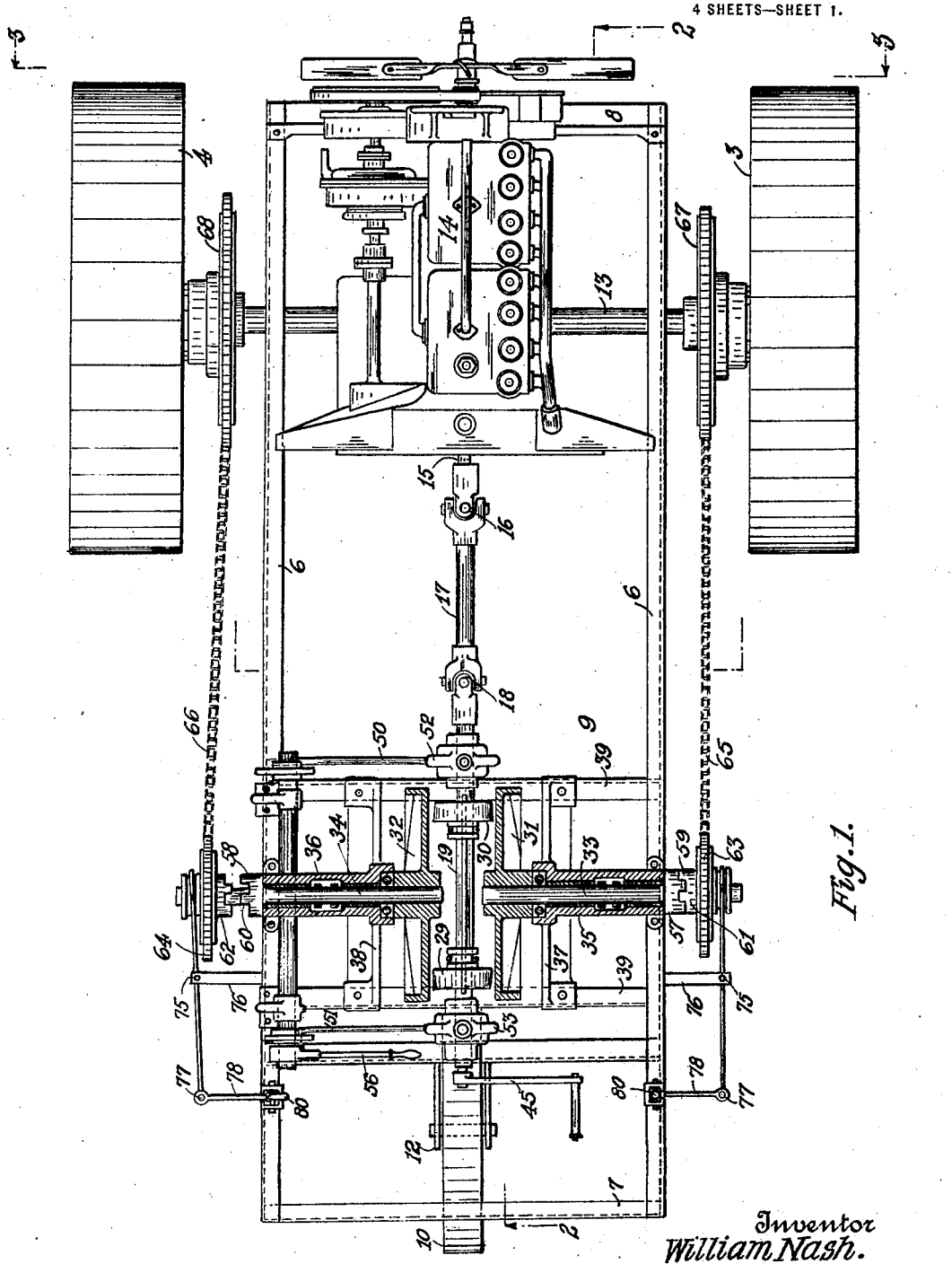
Figure 1 is a top plan view of my improved tractor, partly in section.

Assuming that the construction is in the position illustrated in Fig. 1, and the operator desires to turn the machine to the left, he will apply the power to the traction wheel 3 to cause the machine to move, for instance, in the forward direction, or toward the right. In this event, the wheel 4 will remain inactive rotatably, while the wheel 3 will move around the vertical center of the wheel 4 as an axis, thus making a very short turn, the caster wheel 10 assuming a position to coöperate with the traction wheels and other parts of the machine.

Again, if it be assumed that the machine has been moved so that its forward extremity, or that toward the right in Fig. 1, is close to a fence so that there is no room to turn in the manner just explained, instead of applying the power to cause the wheel 3 to move forwardly, the friction pinions will be shifted to reverse the travel of the machine which will cause the wheel 3 to move in the rearward direction around the vertical center of the wheel 4, as a pivot, thus making it practicable to make as short a turn as may be desired. This may be accomplished by causing the wheel 3 to move either forwardly or rearwardly, as circumstances may require, or dictate. Of course, when the motion of the wheel 3 is reversed in order to make the turn, it will be necessary that the front end of the machine shall be far enough from the fence to allow its rear extremity to extend in the direcíon of the fence after the machine has been turned.

From the foregoing description, the use and operation of my improved tractor will be readily understood.

Assuming that the shaft 19 is shifted to cause the friction pinion 29 to engage the friction disk 32, and the friction pinion 30 to engage the companion disk 31, both shafts 33 and 34 will be rotated whereby corresponding movement will be imparted to the traction wheels to cause the machine to travel forwardly. It is evident that in order to reverse the travel of the machine, it will only be necessary to reverse the position of the shaft 19 or throw the same to the position indicated by dotted lines in Fig. 4. In the dotted line position in this view, the friction pinions are also shown closer together, whereby they engage the friction disks near the center, whereby more rapid movement will be imparted to the machine.

Figure 6:
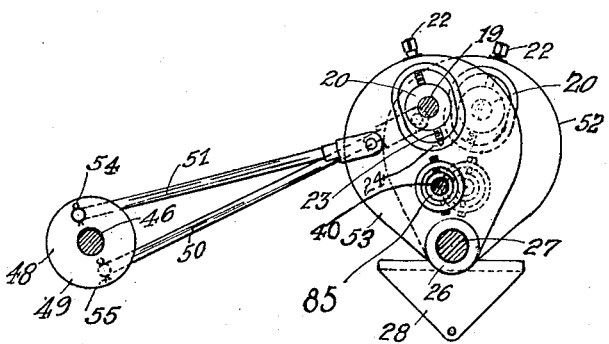
Fig. 6 is a section taken on the line 6—6 Fig. 4, viewed in the direction of the arrows.
Figure 5:
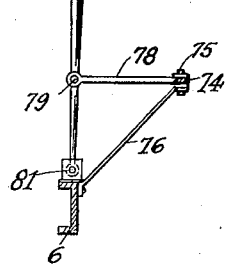
Fig. 5 is a section taken on the line 5—5 Fig. 4.

Attention is called to the fact that the screw shaft 40 during the shifting of the yokes 52 and 53 in opposite directions necessary to give the shaft 19 the diagonal position whereby the friction pinions are caused to engage their corresponding friction disks, as heretofore explained, must move out of its normal alinement, corresponding with the neutral position of the shaft 19, sufficiently to maintain substantial parallelism with the shaft 19, and in order to permit this movement and at the same time allow the yokes to move on their pivot shaft in opposite directions as explained, the journals of the shaft 40 engage bearings 85 mounted in openings formed in the yoke and pivoted on axes parallel with the axes of the pivots of the bearings 20 of the shaft 19. This construction is best illustrated in Figs. 3 and 6.

I claim:—

1. In combination, a frame, a support therefor including traction wheels, an operating shaft, gears arranged on opposite sides of the shaft and having their axes approximately at right angles to the axes of the shaft, pinions mounted on the shaft on opposite sides of the axial centers of the gears, an operative connection between the gears and the traction wheels, spaced pivoted yokes having movable bearings in which the operating shaft is journaled, the shaft being normally positioned between the gears to maintain the pinions out of engagement with the gears, and means for adjusting the yokes to cause the pinions to respectively engage the gears.

2. In combination, a frame, a support therefor including traction wheels, an operating shaft, gears arranged on opposite sides of the shaft and having their axes approximately at right angles to the axes of the shaft, pinions mounted on the shaft on opposite sides of the axial centers of the gears, an operative connection between the gears and the traction wheels, spaced pivoted yokes having movable bearings in which the operating shaft is journaled, the shaft being normally positioned between the gears to maintain the pinions out of engagement with the gears, and means for adjusting the yokes to cause the pinions to respectively engage the gears, the pinions being splined on the operating shaft and longitudinally adjustable to vary the speed of the gears.

3. In combination, a frame, a support including traction wheels, an operating shaft, spaced pivoted yokes having movable bearings in which the shaft is journaled, friction disks arranged on opposite sides of the shaft, the shaft being normally so positioned that its axis is at right angles to those of the disks and so that the pinions are out of engagement with the disks and arranged on opposite sides of the centers of the disks, and means for shifting the yokes to cause the pinions to engage the respective disks.

4. In combination, a frame, a support including traction wheels, an operating shaft, spaced pivoted yokes having movable bearings in which the shaft is journaled, friction disks arranged on opposite sides of the shaft, the shaft being normally so positioned that its axis is at right angles to those of the disks and so that the pinions are out of engagement with the disks and arranged on opposite sides of the centers of the disks, and means for shifting the yokes to cause the pinions to engage the respective disks, said means including a rock shaft and pitmen for operatively connecting the shaft and yokes.

5. The combination of a frame, a support therefor including traction wheels, an operating shaft, spaced yokes pivotally mounted and having movable bearings located beyond the pivotal axis, and in which the shaft is journaled, disks arranged on opposite sides of the shaft and connected in operative relation with the traction wheels, pinions spaced on the shaft and arranged on opposite sides of the centers of the disks, the pinions being normally out of engagement with the disks, a second shaft journaled in the yokes and in movable bearings, with which the yokes are provided, the last named shaft having right and left threaded portions, nuts respectively mounted thereon, and an operative connection between the nuts and the pinions whereby, as the screw shaft is rotated the pinions will be moved in opposite directions on the operating shaft.

In testimony whereof I affix my signature.

WILLIAM NASH.